Dec. 12, 1933.  S. A. ESKILSON  1,938,819
AUTOMATIC WELDING APPARATUS
Filed April 24, 1930  4 Sheets-Sheet 1

Inventor
Sven August Eskilson
By Cyrus N. Anderson
Attorney

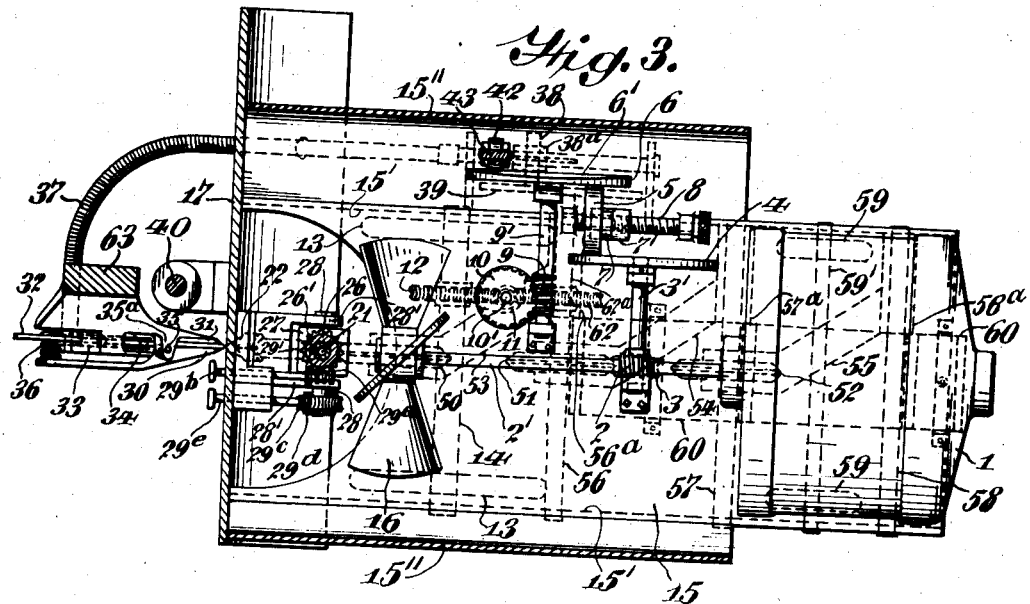
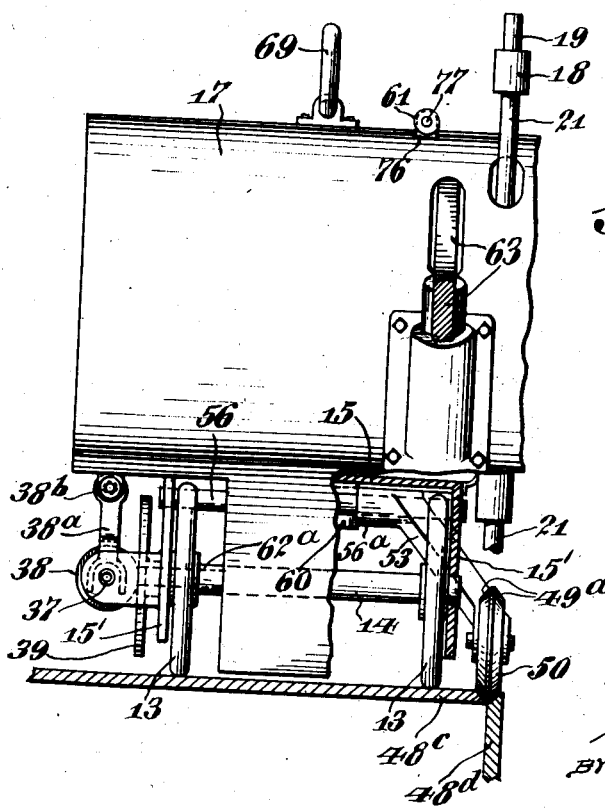

Dec. 12, 1933. S. A. ESKILSON 1,938,819
AUTOMATIC WELDING APPARATUS
Filed April 24, 1930 4 Sheets-Sheet 4
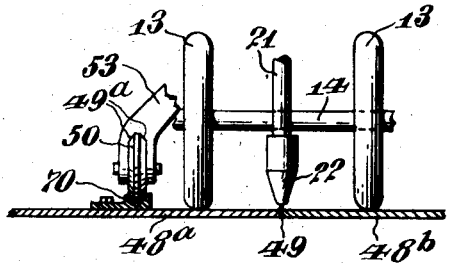
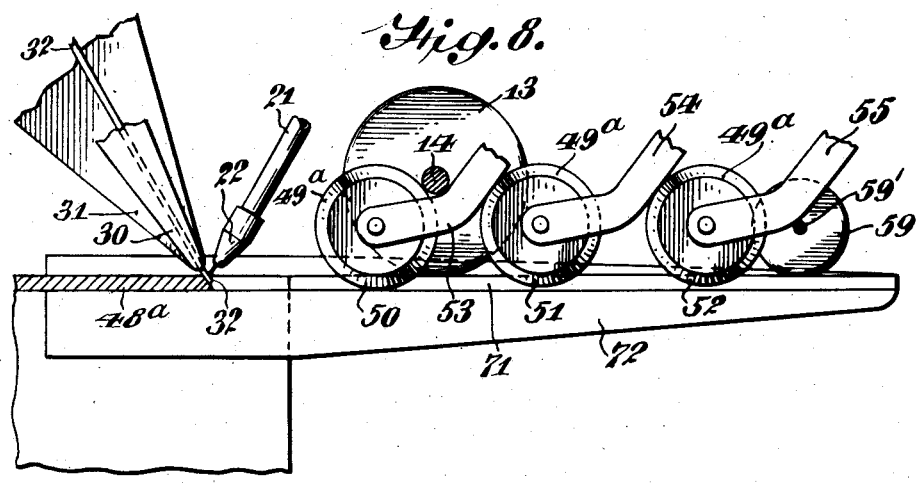
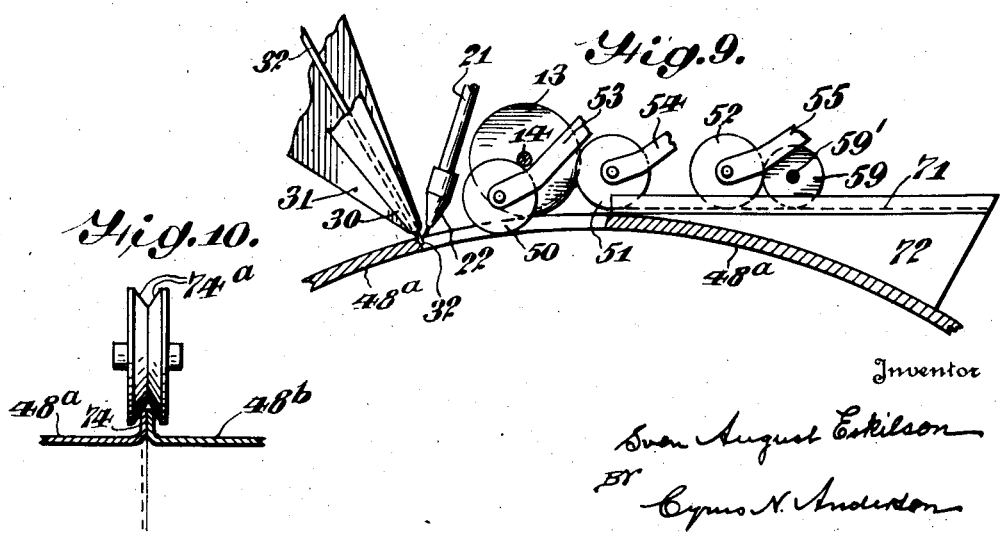
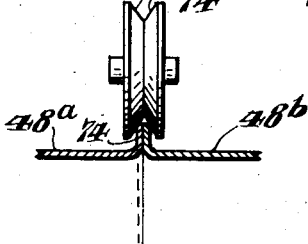

Patented Dec. 12, 1933

1,938,819

UNITED STATES PATENT OFFICE 1,938,819

AUTOMATIC WELDING APPARATUS

Sven August Eskilson, Stockholm, Sweden, assignor to American Gasaccumulator Company, Elizabeth, N. J., a corporation of New Jersey Application April 24, 1930, Serial No. 446,870, and in Sweden May 1, 1929

24 Claims. (Cl. 29—33)

An application for Letters Patent was filed in Sweden on May 1, 1929.

My invention relates to automatic welding apparatus or machines. The machine embodying my invention is of a character such that it may be employed to effect the fusion of the contacting edges of metal parts in order to effect the welding or uniting thereof, or it may be employed to unite the adjoining edges of metal parts by effecting the fusing and depositing of additional metal upon or in interposed relation to the said edges.

Hitherto it has been the practice for the most part to effect the welding of metal parts by manual operations but such operations are not satisfactory for various reasons. One of these reasons is the lack of uniformity in the work which may be due to carelessness or may be due to the fact that it is impractical for a person manually to so operate as to produce a uniform result. Another objection to welding by manual operations is one of expense. The process or method is slow and in consequence the expense is great.

The machine embodying my invention is of a character such that it is adapted to rest upon and be supported by the work; that is to say, the metal parts which are being united. It is not required to support the work and in consequence it is necessary only that it be of a strength and ruggedness sufficient to properly support the means by which the heat is supplied for effecting fusion of the contacting parts of the metal being united or for fusing the metal which is added to or interposed between the edges of said parts.

Even should it be desired to employ means for hammering or impacting the interposed or added metal such means is relatively light and in consequence the light weight characteristic of the structure is not destroyed.

Hitherto welding machines of a capacity to support the work and cause the edges of the parts which are to be united by welding to travel past the heat providing means have been employed, but such machines have been very expensive to manufacture and for that reason alone they have not met the want which exists in industry. Furthermore, it has not been practical to provide machines of this character which have satisfactorily supported the work and conveyed it past the heat providing element of the structure which is necessary in welding operations.

The machine of my invention is of such light weight construction that it is portable and may be transferred readily from one piece of work to another. It will be obvious to those skilled in the art that the heat for effecting the welding operation may be provided by means of a gas flame, such as an oxy-acetylene flame, or it may be provided by means of electricity.

The machine embodying my invention is provided with means by which it may be supported upon the work so as to travel thereon and thereover, and the said machine is adapted to be power driven. The power for driving or causing traveling movement of the machine over the work so as to cause the heat providing means to travel in proper relation to the edges of the metal parts to be united may be obtained in any suitable way and from any suitable source. The apparatus or machine may be moved or driven relative to the work by an electric motor mounted thereon, or it may be driven by any other suitable means or by a power other than electricity of any suitable character. It is preferred that the machine or apparatus shall be self-contained; that is, it should contain the means for providing power by which its movement relatively to the work may be effected, but I desire it to be understood that the power for driving or causing movement of the machine or apparatus relative to the work may be derived from any suitable source.

The general object of the invention is to provide a welding apparatus or machine of light weight construction so that it may be supported directly upon the work upon which the machine is to operate; to provide means whereby the machine is caused to travel automatically over the work with the heat supplying or providing means in proper relation to the parts of the metal pieces which are being united; to provide a machine having means for automatically supplying additional metal into proper cooperative relation to the heat providing means for effecting fusion thereof and to deposit the same in the joint between the adjoining edges of the parts to be united or welded together; to provide means for effecting oscillating movement of the heat applying means, whether it be an electrode or a gas burner, with respect to the fused additional metal for the purpose of preventing the portion thereof which does not become fused from sticking to the walls of the joint; to provide means whereby the metal which is added to and interposed between the adjoining edges which are being united may be subjected to a series of successive blows by a suitable hammering device to effect impacting and solidifying of the added metal; to provide means whereby the heat created or produced by the heat providing means for effecting fusion of the metal, either that which may be added as above described or that of the edges of the parts which are being united, may be dissipated; and to provide means for shielding the main part of the apparatus from the burner, electrode or other means by which the welding heat is provided.

I shall not here undertake to enumerate all of the various objects and advantages of my invention but such additional objects and advantages will be referred to in the detailed description of the said invention which follows or else will become apparent from such description.

In order that the invention may be readily understood and its practical advantages fully appreciated reference should be had to the accompanying drawings wherein I have illustrated a mechanical embodiment of my invention in the form which at present is preferred by me, but it is to be understood that the invention is susceptible of embodiment in other forms of construction than that illustrated and that changes in the details of construction may be made within the scope of the claims without departing from the invention or the principle thereof.

In the drawings:

Fig. 3 is a view in horizontal sectional plan;

Fig. 7 is a view of a fragmentary portion of the structure showing a modified construction of means for guiding the apparatus with respect to the edges of the metal parts which are to be welded together;

Fig. 8 is a view of a fragmentary portion of the apparatus showing means supplemental to the work for supporting the said apparatus;

Fig. 9 is a similar view showing means for supporting the apparatus in proper relation to a curved surface;

Figure 1:
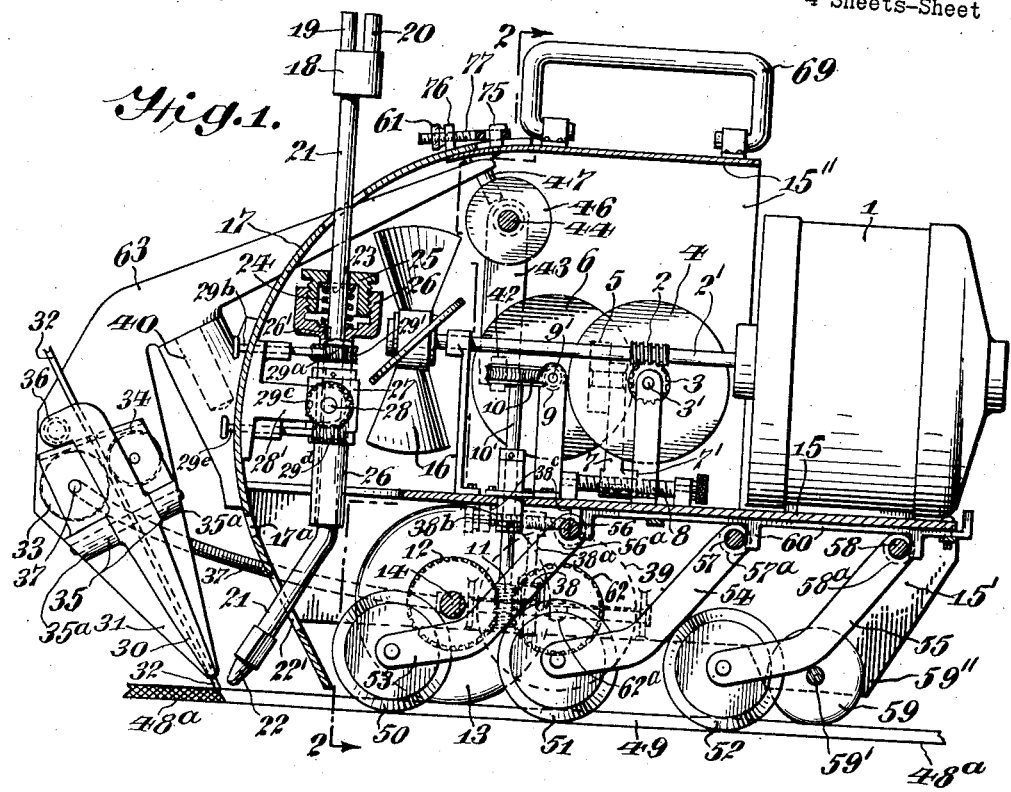
Fig. 1 is a vertical longitudinal sectional elevation of an apparatus or machine embodying the invention.

Fig. 10 is a view showing means adapted to be carried by the apparatus whereby it may be guided with relation to the work by a projection instead of a groove as shown in preceding figures of the drawings; and Fig. 11 is a view showing a construction wherein the heat providing means for effecting the welding of metal parts together is located in different position with respect to other parts of the apparatus from what is shown in preceding figures of the drawings.

In the drawings I have shown at 1 an electric motor mounted upon a portion of the frame of the machine for causing movement of the apparatus with respect to the work to be accomplished thereby. A worm 2 is provided upon the shaft 2' of the motor which worm engages a worm gear 3 mounted upon a shaft 3' which extends in angular relation to the shaft 2'. The shaft 3' is provided upon its outer end with a friction disc 4 which is in engagement with a disc 5 which also is in engagement with a disc 6 the outer side 6' of which is inclined at an acute angle with respect to the axis of rotation thereof. The disc 5 which transfers power from the friction disc 4 to the friction disc 6 to rotate the latter may be referred to and regarded as a transmission disc. The disc 5 is supported upon the upper end of a bar 7 the lower end of which terminates in an enlargement or hub portion 7' having a screw threaded opening therethrough which is in engagement with a screw threaded rod 8 mounted in bearings provided upon the projections which extend upwardly from a horizontal portion 15 of the frame of the machine. The said frame also comprises depending side wall portions 15' and an upwardly extending portion 15" which in effect constitutes a housing for portions of the apparatus. By rotating the screw threaded bar 8 the upwardly extending bar 7 is adjusted lengthwise thereof so as to adjust the transmission disc 5 toward or from the axes of rotation of the discs 4 and 6. The disc 6 is mounted upon a shaft 9' (which is parallel to the shaft 3'). The shaft 9' is provided at its end opposite the disc 6 with a worm 9 which is in engagement with a worm gear 10 mounted upon the upper end of a vertical shaft 10' the lower end of which is provided with a worm 11 which is in engagement with a worm gear 12 which is mounted upon a shaft 14 which shaft is supported at its opposite ends in bearings provided in the depending portions 15' of the frame of the machine. The shaft 14 is provided with supporting wheels 13 which operate as the friction means for causing movement of the apparatus with respect to the work. Rotation of the traction wheels 13 is effected by power from the motor 1 applied through the gear connection previously herein described, and such rotation in the operation of the apparatus is in a direction to cause movement of the said apparatus in a front-wise direction, which is toward the right in Fig. 1 of the drawings. Additional supporting means consisting of wheels 59 is mounted on the shaft 59' which is journaled in extensions 59" of the side portions 15' of the frame previously referred to.

For the purpose of cooling parts of the machine and the portions of the work in front of the point at which the welding operation is taking place I have provided a fan 16 which is secured to the rear end of the shaft 2'. Rotation of the fan with the shaft 2' produces and directs a blast of air against the concaved side of a curved shield 17. The said shield is so curved as to direct the air downwardly against the work in front of the point where the welding is taking place, and also causes the same to flow or pass around the portions of the apparatus below the horizontal part 15 of the frame of the machine. It may be noted that the lower edge of the shield 17 terminates in a plane in adjoining relation to the work. This relationship is shown in Fig. 1 of the drawings. The shield is adjustable for a purpose as hereinafter referred to and described more in detail.

The motor should operate as nearly as may be practically possible at a constant speed; that is, the shaft 2' should make as nearly as possible the same number of revolutions per minute of time during the operation of the apparatus. To that end the fan and motor are so dimensioned that the fan constitutes the principal load to be overcome by the motor. By this means the total load becomes very nearly if not quite constant.

The shield 17 constitutes the means employed in the apparatus for supporting the welding means and also the holder for holding and guiding the metal bar or wire for supplying the additional material to be applied to the joint between the two parts being welded together during the welding operation.

The welding members in the construction shown comprise a gas mixing chamber 18 to which gases such for example as oxygen and acetylene are supplied through the tubular fittings 19 and 20 to which gas supplying tubes are adapted to be attached. The gases after having been mixed together in the mixing chamber 18 flow therefrom through the tube 21 to the burner nozzle 22 which when ignited supplies the flame which in turn supplies heat for effecting the welding operation. The burner is directed toward the middle line of the joint between the edges of the parts which are being welded together. The lower end portion of the tube 21 is bent rearwardly and passes through an opening 22' provided in the shield 17 near the lower edge thereof. It is bent so that the welding burner flame makes a suitable angle with the surface of the work. It may be noted that it extends in convergent relation to the means which has been referred to for supporting and guiding the metal bar or wire for supplying additional material to the joint between the edges which are being welded. The tube 21 is adjustable lengthwise or vertically so as to adjust the position of the burner nozzle 22 toward and from the welding point so as to properly position the welding flame with respect to such point. The said tube also is adjustable laterally by means which will be referred to in detail hereinafter.

For the purpose of adjusting the tube 21 lengthwise or vertically it is provided with a circular flange 23 which is seated against the inner side of the bottom of a hollow nut 25 which is in adjustable screw threaded engagement with the interior of an enlarged cup-like portion at the upper end of a sleeve 26 through which the pipe 21 extends. A coiled spring 24 surrounds the pipe 21 and is located within the hollow nut 25 and the cup-like portion upon the upper end of the sleeve 26. The lower end of the spring is seated upon the upper end of the sleeve 26 while its upper end is seated against the lower side of the flange 23. The spring is under compression and its tendency to expand holds the pipe 21 in its uppermost position with the flange 23 against the inner side of the bottom of the hollow nut 25. It may be noted that the pipe 21 extends through an opening through the bottom of the nut 25. By adjusting the nut 25 the pipe 21 may be moved or adjusted lengthwise.

The pipe 21 has key connection as indicated at 26' with the sleeve 26 whereby it is permitted to move lengthwise but is prevented from rotating therein. The sleeve 26 extends through and is mounted in an opening through a block 27 which is pivotally mounted by means of trunnions 28 in bearings provided in the arms 28' at the inner end of a bracket 29 which is secured upon the inner or front side of the shield 17. The sleeve 26 is rotatably mounted in the opening through the block 27 but is held against longitudinal or lengthwise movement therethrough. For the purpose of rotating the sleeve 26 I have provided the same with a worm wheel 29' with which is engaged a worm 29$^a$ provided upon the inner or front end of a manually rotatable shaft 29$^b$ which is mounted in an opening provided in the shield 17 as is shown in the drawings. For the purpose of effecting pivotal movement of the block 27 about the axis of the trunnions 28 the end of one of the said trunnions is extended and is provided with a worm gear 29$^c$ which is in engagement with a worm 29$^d$ upon the inner end of a manually rotatable shaft 29$^e$ which is mounted in an opening provided in the shield 17. It will be apparent that if the block 27 is caused to move about the axis of the trunnions 28 by which it is supported the lower end of the burner nozzle 22 will be moved toward or from the welding point depending upon the direction in which the block 27 is pivotally moved. Due to the fact that the lower end portion of the pipe 21 is bent toward the left or toward the rear of the machine it will be apparent that upon rotation of the sleeve 26 the lower end of the pipe will be moved transversely of the medial or center line of the welded joint in the arc of a circle. It will be seen, therefore, that means is provided whereby the lower end of the burner nozzle may be adjusted to any position with respect to the point at which the welding takes place.

Reference has been made previously to the means for holding and guiding a bar or wire for furnishing additional material to be applied to the joint between the edges of the metal parts which are welded together. The said holder comprises two jaws 30 and 31 between which the bar or wire 32 is fed by means of rollers 33 and 34 located between the said jaws. The jaw 30 is pivoted at 35 to the jaw 31, ears 35$^a$ being provided for the purpose. A spring 36 located between the upper end of the jaw 30 and an adjoining portion of the jaw 31 operates to hold the lower end of the said jaw 30 in yielding contact with the adjoining side of the lower end of the said jaw 31. The lower end of the jaw 30 is pressed yieldingly against the bar or wire 32 and holds the same between the said jaws and at the same time permits it to be fed forward to the welding point by the action of the feeding rollers 33 and 34.

For the purpose of feeding the bar or wire 32 through the said holding means the roller 33 is driven by means of a flexible shaft 37 which is provided with a friction roller 38 at its inner end distant from the said roller 33, which friction roller engages a friction disc 39. For the purpose of varying the speed of rotation of the friction roller 38 and consequently of the flexible shaft 37 the said friction roller is adapted to be moved toward or from the axis of rotation of the said friction disc 39. For the purpose of effecting such adjustment I have provided an arm 38$^a$ which is supported by and has screw threaded connection with a manually rotatable or adjustable screw threaded rod or shaft 38$^b$ which is rotatably mounted in bearings provided in lugs or projections 38$^c$ which depend from the horizontal portion 15 of the frame of the machine. The friction disc 39 is mounted upon an end of a shaft 62ª which shaft is rotatably mounted in openings provided in the opposite side portions 15ª of the frame structure. Near its end opposite that on which the friction disc 39 is mounted the said shaft 62ª is provided with a worm gear 62 which is in engagement with the worm 11 provided upon the lower end of the vertical shaft 10'. Rotation of the shaft 10' not only causes rotation of the worm gear 12 but also causes rotation of the worm gear 62 thereby causing rotation of the shaft 62ª to rotatably drive the friction disc 39 to thereby drive and cause rotation of the flexible shaft 37.

The jaw 31 of the holder for the additional material previously referred to consists in the construction shown of a rearward and downward extension of a lever 63 provided intermediate its ends and upon its lower edge with a cylindrical projection 40 which extends into a cylindrical opening provided in a bracket 41 mounted upon the rear outer side of the shield 17. The upper end of the double arm lever 63 is provided with a projection or pin 47 which is adapted to extend inwardly and engage parallel flanges at the opposite ends of rings or sleeves 46 and 46ª mounted upon a shaft 44 which is reciprocatable. The said shaft is supported at its opposite ends in openings provided in the upper part of the portion 15" of the frame of the machine.

Figure 2:
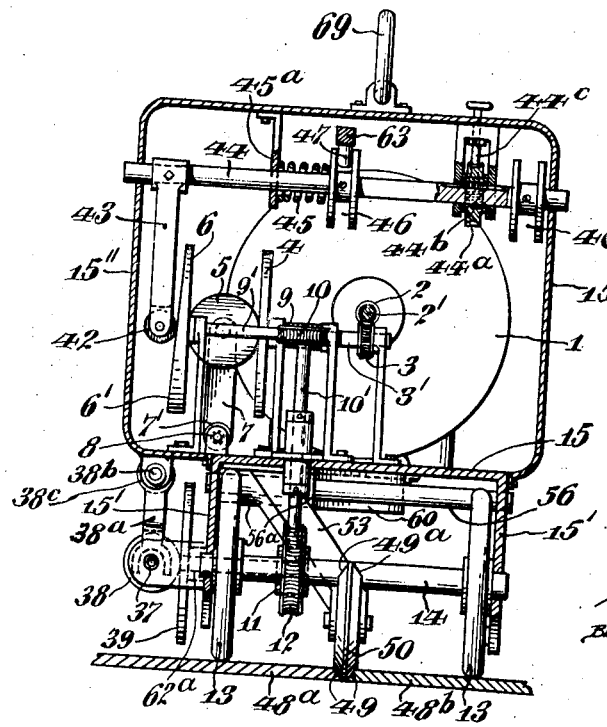
Fig. 2 is a view in transverse section taken approximately on the line 2—2 of Fig. 1.
Figure 4:
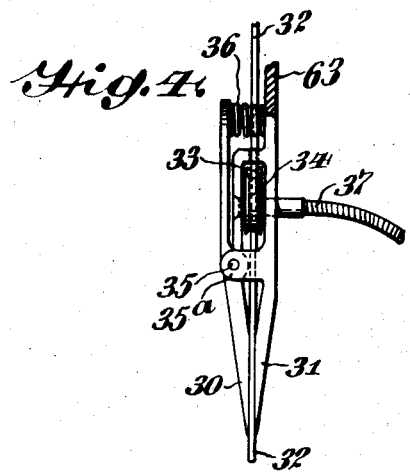
Fig. 4 is a view in front elevation of the holding and guiding means for holding and supplying a fusible metal bar or wire to the welding point, the support therefor being shown in cross section.

With the parts of the apparatus arranged as shown in Figs. 1, 2 and 3 of the drawings the projection or lug 47 is located between the flanges of the sleeve or ring 46, whereas in the arrangement shown in Fig. 11 of the drawings the said lug or projection 47 would be located between the flanges at the opposite ends of the sleeve or ring 46ª.

For the purpose of holding the shaft 44 together with the sleeves or rings 46 and 46ª toward the right, having reference to Fig. 2 of the drawings, I have provided a coiled spring 45 which extends around the shaft 44, one end of the said spring being seated against a stationary abutment or seat 45ª while the other end thereof is seated against the adjoining end of the sleeve or ring 46. The said spring is normally under compression and its tendency to expand operates to hold the shaft 44 toward the right with the friction roller 42 in contact with the side 6' of the disc 6. The friction roller 42 is supported at the lower end of an arm 43 which depends from the shaft 44 as is shown in Fig. 2 of the drawings. The roller 42 contacts with the disc 6 at a point a distance from the axis of rotation thereof. The side or surface 6' of the disc 6 being inclined as described it follows that upon rotation of the said disc the roller 42 is caused to move in and out in a direction parallel with the axis of the shaft 9' so that the shaft 44 is given a reciprocatory movement. The flanges at the opposite ends of the sleeve or ring 46 on the shaft 44 acting upon the projection or pin 47 impart to the double-armed lever 63 an oscillatory movement about the axis of the pivot pin or projection 40 so that the lower end of the holder is oscillated transversely or crosswise of the center or medial line of the joint between the edges of the parts which are being welded together. For the purpose of varying the amplitude of the oscillations of the lower end of the holder for the bar or wire 32 the friction roller 42 may be moved to different positions relative to the axis of rotation of the friction disc 6. To effect adjustment of the friction roller 42 with respect to such axis I have provided upon the shaft 44 a worm gear 44ª with which is engaged a worm 44ᵇ provided upon a manually rotatable shaft 44ᶜ mounted upon the portion 15" of the frame of the machine. By rotating the said shaft 44ᶜ in one direction or the other the shaft 44 likewise may be adjustably rotated in one direction or the other to thereby adjust the friction roller 42 toward or from the axis of the friction disc 6. The position of the friction roller 42 relatively to the axis of rotation of the disc 6 determines the extent of the reciprocatory movements of the shaft 44.

For the purpose of cooling parts of the structure and also additional material as embodied in the bar or wire 32 in rear of the shield 17 I may provide holes therein as indicated at 17ª through which the air from the fan 16 may pass.

In some cases in order to obtain a thorough welding together of the metal parts it is necessary that additional material be supplied to the joint between the edges which are secured together. In such case it is necessary to bevel the adjoining edges of the metal pieces thereby providing a groove as indicated at 49 in Fig. 2 of the drawings. The said groove operates as a means for guiding the apparatus with the heat supplying means in proper relation to the joint between the edges to be welded together.

In other cases where the metal pieces which are being joined together are thinner than those indicated in Fig. 2 of the drawings and where the edges are not beveled, as indicated in Fig. 7, a separate guiding means including a groove is provided which is so related to the joint between the edges which are being welded together as to properly guide the welding tool, whether a gas burner or an electrode, in proper relation to the joint between the edges which are being united. The separate guiding means should be arranged in parallel relation to the joint between the edges of the metal parts or pieces which are being united.

In other cases, as will be pointed out hereinafter more in detail, the guiding means extends beyond the metal parts which are being united so as to provide means whereby the welding of the adjoining edges throughout their entire length may be facilitated.

In Figs. 1 and 2 of the drawings the metal pieces or parts 48ª and 48ᵇ are of a thickness such that in order to facilitate the uniting of the edges thereof by welding the said edges are beveled as indicated at 49 to form a groove as best shown in Fig. 2. For the purpose of guiding the apparatus with the welding tool thereof in proper relation to the edges of the parts 48ª and 48ᵇ I have provided guiding rollers 50, 51 and 52 the peripheries of which are wedge shaped as indicated at 49ª so that their edges will fit the groove 49 as shown in Fig. 2. The said guiding rollers are mounted on the lower ends of arms 53, 54 and 55 the upper ends of which are pivotally mounted upon the shafts 56, 57 and 58. The rollers tend to swing about the shafts 56, 57 and 58 so that they are held by gravity in engagement with the groove 49. The said shafts are supported at their opposite ends in the parallel side portions 15' of the frame of the machine.

The purpose of employing three guiding rollers 50, 51 and 52 spaced from each other as shown is to effect satisfactory guiding when the so-called "hitching method" is employed in the welding operation. By reference to the "hitching method" is meant that at certain intervals relatively short portions of the adjoining edges of the metal parts are welded together for the purpose of retaining the said parts in proper relation to each other. The distance between any two of the rollers 50, 51 and 52 should be greater than the length of the said short welded portions so that at all times two at least of the said rollers will be in engagement with the groove between the adjoining edges along which the welded joint is being formed.

It will be understood that the apparatus is adapted for use in the welding together of the edges of parts of different shapes. For example, the apparatus may be employed to produce a straight welded joint such as that between the straight edges of metal sheet parts; or it may be employed to produce a welded joint in the direction of the generator on the surface of a cylinder. The arrangement may be such that the respective wheels of the pairs of supporting wheels 13 and 59 are arranged on opposite sides of the welded joint with the said joint located underneath and almost centrally of the apparatus as indicated in Fig. 2 of the drawings.

The apparatus may be used for the welding of joints in the bottoms of cylindrical vessels, the joints being so located with respect to the bottoms of such vessels that the respective wheels of the pairs of supporting wheels 13 and 59 cannot be located upon opposite sides thereof. In such case certain parts of the apparatus are re-arranged and so positioned as to accommodate the conditions such as are presented in Fig. 11 of the drawings. It will be noted that in the construction as illustrated in Fig. 11 the guide rollers 50, etc., are transferred to one side of the apparatus so that they may engage the guiding groove 49 between the edges of the parts 48ᶜ and 48ᵈ which are being welded together.
It also will be noted that the gas supply pipe 21 has been moved to a position to correspond to the change in relation of the machine to the edges which are to be united by welding. The pipe, as is apparent, is located in a vertical plane which also includes the medial or middle line of the joint between the edges of the parts 48ᶜ and 48ᵈ which are being united.

In the construction as illustrated in Fig. 11 both of the supporting wheels 13 as well as the supporting wheels 59 are located on the same side of the joint between the edges which are being welded together. It also will be noted that the double-armed lever 63 has been moved to a different position in the apparatus and when in such position the projection or pin 47 at the upper end of the said lever extends between the flanges at the opposite ends of the sleeve or ring 46ᵃ shown in Fig. 2. It may be noted that the arms 53, 54 and 55 for supporting the respective guide wheels 50, 51 and 52 are movable on the shafts 56, 57 and 58 from the positions in which they are shown in Figs. 1 and 2 to those in which they are shown in Fig. 11 and vice versa by means of a rule 60 working upon the bearings 56ᵃ, 57ᵃ and 58ᵃ at the upper ends of the said arms.

In Fig. 7 I have shown the parts 48ᵃ and 48ᵇ provided with a special guiding groove 70 which is located upon the part 48ᵃ a considerable distance from the joint at 49 between the two parts. Although only one of the guiding wheels is shown in Fig. 7 it will be understood that all three of the said guiding wheels 50, 51 and 52 may be employed and that each of them travels in the said groove 70. The groove is arranged in parallel relation to the joint 49 so that the burner 22 (or an electrode if an electrode should be employed) is guided in proper relation to the joint 49.

In Fig. 8 of the drawings I have shown means whereby the edges of the two parts which are to be welded together may be joined to the extreme ends thereof. For that purpose I have provided a groove 71 which is formed in a bracket or console 72 which extends beyond the metals parts as shown in said figure. It will be seen by reference to that figure that the apparatus in the completion of the welding joint is supported by the console and not by the parts themselves.

In Fig. 9 of the drawings I have shown a similar support 72 provided with a groove located in a plane including the medial or middle line of the joint between two hollow cylindrical members the edges of which are being united by welding as indicated. The abutting of the edges of the adjoining cylindrical portions provides a circular joint which may be caused to guide the apparatus with respect to the work in the manner as previously described in connection with Figs. 1, 2 and 3 of the drawings. The cylindrical members with their adjoining edges in contact may be rotated in a direction opposite to that in which the apparatus is adapted to move at a speed corresponding to that at which the apparatus normally moves in order that the welding tool may be caused to change its position progressively relatively to the joint between the edges and to progressively unite the said edges. As indicated, the adjoining edges of the cylindrical parts to be united may be beveled to provide a groove which will guide the apparatus, or if desired or if it should be necessary a special guiding groove may be provided as indicated in Fig. 7 of the drawings. For supporting the apparatus during the welding of the last part of the joint a console 72 provided with a guiding groove is placed in suitable relation to the work as shown in Fig. 9, as already indicated, whereby the guiding groove 71 therein forms a continuation of the joint between the edges which are being united, which groove may be either straight or curved.

If the apparatus is employed to weld together edge joints such as are indicated at 74 in Fig. 10 it may be guided with respect thereto by means of guide wheels having grooves therein as indicated at 74ᵃ which grooves are engaged by the edges of the parts which are to be united by welding. Although only one guide roller is shown in Fig. 10 it will be understood that three such rollers may be employed as shown in Fig. 1.

In order to adapt the apparatus for the welding of curved surfaces means should be provided for effecting vertical adjustments of the shield 17. To facilitate such adjustments the upper curved edge portion of the said shield is located in contact with a similarly curved edge portion of a part of the frame 15″ of the machine. To effect such adjustment the top portion of the frame 15″ is provided with a projection 75 with which is pivotally connected a link 77 which engages an opening through a projection 76 provided upon the shield 17 near the upper edge thereof. The outer swinging end of the link 77 is screw threaded and is provided with a nut 61. By adjusting the nut 61 to adjust the projection 76 toward and from the projection 75 the shield 17 is correspondingly adjusted thereby causing vertical adjustment of the said shield.

Figures 5, 6:
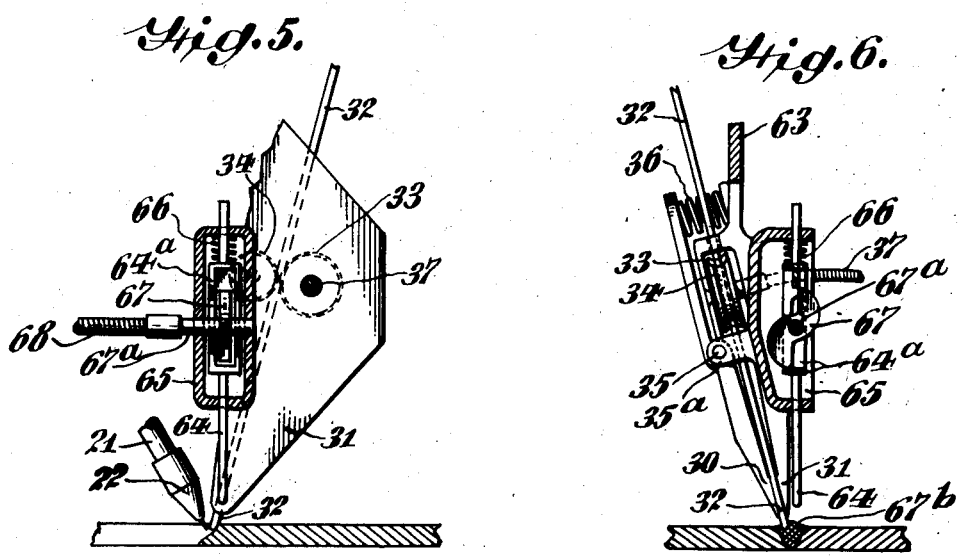
Fig. 5 is a view looking toward the left in Fig. 4 showing means in association with the bar or wire holding and guiding device for successively striking the additional metal which is deposited in the joint between the adjoining edges of two metal parts which are being welded together for impacting the same, the said means being shown in section.
Fig. 6 is a view partly in section and partly in elevation looking toward the left in Fig. 5.

In Figs. 5 and 6 of the drawings I have shown a construction wherein a hammer or similar tool is provided in association with the means for holding and supplying the metal bar or wire 32. The purpose of such hammer or similar tool is to beat or strike the additional metal supplied to the joint by successive blows in order to impact or condense the same. The impacting device comprises a hammer 64 which is reciprocatably supported by means of a hollow casing 65 which is supported upon the jaw 31 of the holder for the metal bar or wire 32. The hammer 64 may be described generally as consisting of a bar the upper and lower ends of which are supported in and guided by openings through the upper and lower ends of the casing 65. The intermediate portion of the hammer bar 64 consists of a rectangular frame 64$^a$ within which is located a cam disc 67 secured to the end 67$^a$ of a flexible shaft 68 which is rotatably driven by means similar to that for driving the similar flexible shaft 37. It is deemed unnecessary to show the extension of the flexible shaft 68 with its end opposite to that shown provided with a friction roller in proper relation to a rotary part of the apparatus whereby it may be driven. The end of the shaft upon which the cam disc 67 is mounted is supported in bearings as shown in Fig. 5 provided upon the casing 65. A spring 66 surrounding the upper portion of the hammer bar 64 with its lower end seated against the upper end of the rectangular frame 64$^a$ and its upper end seated against the inner side of the upper end of the casing 65 tends to hold the said hammer in its lowermost position. When the cam disc 67 is rotated it contacts twice during each revolution with the upper part of the frame 64$^a$ to elevate the same to compress the spring 66. When the said frame is released by the said cam disc the spring 66 quickly expands and causes the lower end of the hammer to strike against the additional metal 67$^b$ to compact and condense the same.

For the purpose of transporting the apparatus from one place to another or from one piece of work to another piece I have provided the same with a handle 69.

I have shown in the drawings and have described an embodiment of the invention in the form which at present is preferred by me and it will be noted that it is of such light weight construction that it may be supported directly upon and by the work upon which it may be operating and also that it may be transported or moved readily from place to place.

It will be noted that when an apparatus embodying the invention is employed the character of the work produced is practically independent of the operator and should be of substantially uniform quality. In other words, the quality of the welded joint which is produced is not dependent upon the personal skill and care of the operator. The apparatus operates automatically in the performance of its functions and hence a welded joint of uniform character is produced.

Although I have shown a gas burner as the means for producing the welding heat of the apparatus it is to be understood that other suitable means such as electrodes may be employed for that purpose. If electrodes should be employed it will be understood that such changes in construction may be and should be made as may be necessary to accommodate the requirements of the different means for supplying the welding heat.

Having thus described my invention what I claim and desire to secure by Letters Patent is:

1. A welding machine of the character described comprising rotatable means for supporting the said machine upon the work, power means for driving certain of the said rotatable means to cause movement of the said machine in a predetermined direction relative to the work, a welding tool located in operative relation to the joint to be welded, the said tool moving with the said machine, means on said machine in advance of said welding tool for engagement with the joint to guide said machine and means for supplying additional metal to the joint which is being welded behind said tool and in the direction of movement of said machine, 2. A welding machine which is adapted to be supported by metal pieces having adjoining edges which are to be welded together, the said machine having rotatable wheels which rest upon the said metal pieces for movably supporting the same thereon, power means for driving certain of the said rotatable wheels for causing movement of the said machine relative to the said metal pieces, a welding tool, a shield for protecting the mechanism of the said machine from the heat of the said welding tool, and means driven by the said power means for directing a blast of air against the said shield, the said shield being shaped so as to deflect the said air onto the mechanism of the said machine.

3. A welding machine which is adapted to be supported upon metal pieces adjoining edges of which are to be secured together by welding, the said machine comprising rotatable wheels by which it is movably supported upon the said metal pieces, an electric motor, driving connections between the said motor and certain of the said wheels for driving the latter to cause movement of the said machine relative to the said metal pieces, a shield with one side facing toward the operative mechanism of the said machine, a welding tool mounted upon the inner side of said shield, the lower end of said tool projecting through said shield and into operative relation to the joint between the metal pieces which are to be united by welding, a holder for holding and supporting a metal bar with one end thereof in adjoining relation to the lower end of the said welding tool, means having operative connection with the said electric motor for feeding the said metal bar into operative relation to the said welding tool, means mounted upon the outer side of said shield for pivotally supporting the said holder, means in engagement with the said holder, and a reciprocating member in engagement with a part of said holder for causing oscillatory movements thereof to effect movements of the portion thereof in adjoining relation to the said welding tool in directions transversely of the joint between the edges of the metal pieces which are being united.

4. A welding machine of the character described comprising a frame having a horizontal portion, rotatable wheels located below said portion and adapted to rest upon the work for supporting the machine on the work, a motor mounted upon the said horizontal portion, gear connections between the said motor and certain of the said wheels for driving the latter to cause movement of said machine relative to the work, a shield a portion of which extends below the said horizontal portion and a portion of which extends above the said portion, one side of said shield facing inwardly toward the mechanism of the said machine, a fan located on said horizontal portion, means whereby the said fan is driven by the said motor to project a blast of air against said one side of the said shield, the said shield directing the air downward and underneath the said horizontal portion to cool the mechanism of the said machine, a welding tool, means located upon said one side of the said shield for supporting said welding tool, the lower end of the said tool projecting through the said shield into a position in cooperative relation to adjoining edges of parts of the work which are to be united by welding, a holder for holding a metal bar with the lower end thereof in adjoining relation to the lower end of the said tool, rollers in engagement with the said metal bar for feeding the same, and means interposed between said rollers and the said motor for driving the rollers to effect feeding movement of the said bar.

5. A welding machine of the character described comprising a frame having a horizontal portion, rotatable wheels located below said portion and adapted to rest upon the work for supporting the machine on the work, a motor mounted upon the said horizontal portion, gear connections between the said motor and certain of the said wheels for driving the latter to cause movement of said machine relative to the work, a shield a portion of which extends below the said horizontal portion and a portion of which extends above the said portion, one side of said shield facing inwardly toward the mechanism of the said machine, a fan located on said horizontal portion, means whereby the said fan is driven by the said motor to project a blast of air against said one side of the said shield, the said shield directing the air downward and underneath the said horizontal portion to cool the mechanism of the said machine, a welding tool, means located upon said one side of the said shield for supporting said welding tool, the lower end of the said tool projecting through the said shield into a position in cooperative relation to adjoining edges of parts of the work which are to be united by welding, a holder for holding a metal bar with the lower end thereof in adjoining relation to the lower end of the said tool, rollers in engagement with the said metal bar for feeding the same, means interposed between said rollers and the said motor for driving the rollers to effect feeding movement of the said bar, and means upon the said shield for oscillatably supporting the said holder.

6. A welding machine which is adapted to be supported by metal pieces having adjoining edges which are to be secured together by welding, the said machine comprising rotatable wheels for supporting the same upon the said metal pieces, power means, connections between the said power means and certain of said wheels for transmitting power to the latter to effect rotation thereof to cause movement of said machine relative to the said metal pieces, the said connections including means adjustable during continued operation of the machine for varying the speed of rotation of said wheels to thereby control the speed of movement of the said machine relative to the said metal pieces.

7. A machine which is adapted to be supported upon work having parts with adjoining edges which are to be united by welding, the said machine comprising rotatable wheels which are adapted to rest upon the work to movably support the machine thereon, power means, gear connections between said power means and certain of said wheels through which power is supplied to said wheels for causing rotation thereof, the said connections including means adjustable during continued operation of the machine for varying the speed of rotation of the said wheels to thereby vary the speed of movement of the said machine relative to the work, and means for guiding said machine relative to the work.

8. A machine which is adapted to be supported upon the work having parts with adjoining edges which are to be united by welding, the said machine comprising rotatable wheels which are adapted to rest upon the work to support the machine thereon, power means, connections between said power means and certain of said wheels for transmitting power to the latter to cause rotation thereof to effect movement of the said machine relative to the work, said connections including means adjustable during continued operation of the machine for controlling the speed of rotation of said wheels, and yielding means mounted upon said machine and engaging the edges of said parts which are to be united for guiding the same machine relative to the joint between said edges.

9. A welding machine which is adapted to be supported upon the work having metal parts with adjoining edges which are to be united by welding, the said machine comprising in combination rotatable wheels which are adapted to rest upon the work for supporting the machine thereon, power means, gear connections between said power means and certain of said wheels through which power is adapted to be transmitted from said power means to the said wheels for rotating the latter to cause movement of the said machine relative to the work, the said connections including adjustable means for varying the speed of rotation of the said wheels, a welding tool, means for supporting the said tool with the lower end thereof in adjoining relation to the middle line between the edges of the metal parts which are to be united, and yielding means carried by the said machine for engaging between the edges of said parts which are to be united for guiding and causing movement of the said machine in a direction parallel with the middle line between the edges which are being united.

10. A welding machine which is adapted to be supported by the work which includes metal parts having edges in adjoining relation to each other which are to be united by welding, the said machine comprising power means for propelling said machine along the work, fan structure, and connections between the said power means and the said fan structure for driving the latter, said fan structure constituting the principal part of the total load to be overcome by the said power means, the propelling of said machine constituting a small part of the total load so that the load to be overcome by the said power means remains very nearly constant.

11. A welding machine which is adapted to be supported upon the work having metal parts with adjoining edges which are to be united by welding, the said machine comprising rotatable wheels for supporting the same upon the work, power means, driving connections between the said power means and certain of the said wheels for causing rotation of the same to effect movement of the said machine relative to the work, a fan, and a connection between the said power means and the said fan for driving the latter, the said fan constituting the principal load to be overcome by the said power means so that the load of the machine to be overcome by the power means is maintained very nearly constant.

12. A welding machine which is adapted to be supported by the work, the said work including metal parts having edges in adjoining relation to each other which are to be united by welding, the said machine comprising in combination rotatable means adapted to rest upon the work for supporting the machine thereon, mechanical means for causing rotation of certain of said rotatable means to effect movement of the said machine upon the work, a welding tool adapted to supply the heat for effecting the welding operation, a shield a portion of which is interposed between the heat supplying portion of the said tool and the said machine, and means for effecting vertical adjustments of the said shield.

13. A welding machine which is adapted to be supported by the work, the latter including metal parts having edges in adjoining relation to each other which are to be united by welding, the said machine comprising in combination rotatable traction wheels which rest upon the work, means for applying power to the said wheels to cause rotation thereof to effect movement of the said machine relative to the work, a shield mounted upon the said machine, a welding tool supported by the said shield, a portion of the said shield being located between the portion of the said tool which supplies the heat for effecting the welding operation and the principal portion of the said machine, a holder and feeding means for holding and feeding a metal bar to the edges of said metal parts which are to be united and into cooperative relation to the said welding tool, the latter fusing the said metal bar, the fused metal being deposited in the joint between the edges of the parts to be united, means carried by the said shield for supporting the said holder and feeding means, and means for vertically adjusting the said shield so as to raise or lower the same with respect to the work.

14. A welding machine which is adapted for uniting adjoining edges of metal parts by welding, comprising means for causing relative movement between the said machine and the edges of the metal parts which are to be united, a welding tool supported by said machine, the portion thereof by which heat is supplied for effecting the welding operation being located in adjoining relation to the edges which are to be united, a holder and feeding means for holding and feeding a metal bar to the joint between the said edges and into cooperative relation to the said welding tool, the heat of the latter fusing the adjoining portion of the said metal bar and causing a deposit of metal in the joint between the said edges, and means operating automatically to impact the metal so fused and deposited in the said joint.

15. A welding machine which is adapted for uniting adjoining edges of metal parts by welding, comprising means for causing relative movement between the said machine and the edges of the metal parts which are to be united, a welding tool supported by said machine, the portion thereof by which heat is supplied for effecting the welding operation being located in adjoining relation to the edges which are to be united, a holder and feeding means for holding and feeding a metal bar to the joint between the said edges and into cooperative relation to the said welding tool, the heat of the latter fusing the adjoining portion of the said metal bar and causing a deposit of metal in the joint between the said edges, and impacting means mounted upon said holder for beating the metal deposited in the joint between the said edges of the said metal parts.

16. A welding machine which is adapted for uniting adjoining edges of metal parts by welding, comprising means for causing relative movement between the said machine and the edges of the metal parts which are to be united, a welding tool supported by said machine, the portion thereof by which heat is supplied for effecting the welding operation being located in adjoining relation to the edges which are to be united, a holder and feeding means for holding and feeding a metal bar to the joint between the said edges and into cooperative relation to the said welding tool, the heat of the latter fusing the adjoining portion of the said metal bar and causing a deposit of metal in the joint between the said edges, a hammer mounted upon the said holder, and means for actuating the said hammer to impact the metal deposited in the joint between the edges of said metal parts.

17. A welding machine which is adapted to be supported upon the work including metal parts having edges in adjoining relation to each other which are to be united by welding, the said machine comprising in combination rotatable wheels for supporting the same upon the work, power means, connections between the said power means and certain of said wheels for transmitting power from said power means to said wheels for driving the latter to cause movement of the machine relative to the work, a welding tool supported with a portion thereof which supplies the heat for effecting the welding operation in adjoining relation to the edges of the metal parts to be united, a holder and feeding means for holding and feeding a metal bar to the said adjoining edges of said metal bars and into cooperative relation to the said welding tool, the heat of said welding tool operating to fuse the metal of said bar and cause its deposit in the joint between the edges to be united, a hammer supported upon the said holding means, a cam disc for actuating the said hammer and causing it to strike successively the metal deposited between the adjoining edges of said parts, and means interposed between the said power means and the said cam disc for driving the latter to actuate the said hammer.

18. A welding machine adapted to be supported by the work comprising means for supporting the machine upon and for propelling the machine along the work, and a plurality of members bearing independently of one another on a guiding surface for guiding the machine along the joint to be welded, said members being mounted so that they can fall and rise independently of each other and of the machine, in accordance with irregularities of the guiding surface or in the shape of the parts being welded.

19. A welding machine adapted to be supported by the work comprising means for supporting the machine upon and for propelling the machine along the work, and a plurality of members bearing independently of one another on a guiding surface for guiding the machine along the joint to be welded, said members being mounted so that they can fall and rise independently of each other and of the machine, in accordance with irregularities of the guiding surface or in the shape of the parts being welded, and with the distance between adjacent members greater than the length of spot welds holding said parts temporarily in position.

20. A welding machine adapted to be supported by the work comprising means for supporting the machine upon and for propelling the machine along the work, and a plurality of members bearing independently of one another on the joint to be welded for guiding said machine, said members being mounted for falling and rising movement independently of one another and of said machine, in accordance with irregularities of the joint.

21. A welding machine adapted to be supported by the work comprising means for supporting the machine upon and for propelling the machine along the work, guide structure disposed parallel to the joint to be welded, and a plurality of members bearing independently of one another on said guide structure and mounted on said machine for movement independent of each other and said machine to guide said machine along said joint despite irregularities in the guide structure or in the shape of the parts to be welded.

22. A welding machine adapted to be supported by the work comprising wheels spaced transversely of said machine and directly engaging the work, a plurality of guiding members bearing independently of one another on the joint to be welded, said members being mounted for falling and rising movement independently of one another and of said machine, in accordance with irregularities of the joint, and means for adjusting said members to accommodate for location of the joint between said wheels or transversely beyond said wheels.

23. A welding machine adapted to be supported by the work comprising means for propelling the machine along the work in a predetermined direction, a welding tool at the rear of said machine, means for feeding welding material in the direction of movement of said machine to a region which is being welded and which is behind said tool, and a plurality of members in advance of said tool bearing independently of one another on the joint to be welded for guiding said machine, said members being mounted for falling and rising movement independently of one another and of said machine, in accordance with irregularities of the joint.

24. A welding machine adapted to be supported by the work, comprising means for welding a joint, means for holding and feeding additional welding material supplied to the joint, means supported by said feeding and holding means for hammering the joint while in molten condition, and means for simultaneously oscillating said holding and feeding means and the hammering means.

SVEN AUGUST ESKILSON.

CERTIFICATE OF CORRECTION.

Patent No. 1,938,819.  December 12, 1933.

SVEN AUGUST ESKILSON.

It is hereby certified that error appears in the printed specification of the above numbered patent requiring correction as follows: Page 7, lines 145, 146 and 147, claim 10, strike out the words "so that the load to be overcome by the said power means remains very nearly constant"; and that the said Letters Patent should be read with this correction therein that the same may conform to the record of the case in the Patent Office.

Signed and sealed this 23rd day of January, A. D. 1934.

F. M. Hopkins (Seal)  Acting Commissioner of Patents.